United States Patent

[11] 3,584,545

| [72] | Inventor | Gunter Ehlscheid<br>Niederbieber, Germany |
|---|---|---|
| [21] | Appl. No. | 833,914 |
| [22] | Filed | June 17, 1969 |
| [45] | Patented | June 15, 1971 |
| [73] | Assignee | Winkler & Dunnebier Maschinenfabrik<br>und Eisengiesseri KG<br>Neuwied am Rhein, Germany |
| [32] | Priority | June 20, 1968 |
| [33] | | Germany |
| [31] | | P 17 61 661.4 |

[54] CONTROL DEVICE
9 Claims, 7 Drawing Figs.

[52] U.S. Cl. .................................................. 93/61,
53/57
[51] Int. Cl. ........................................................ B31b 1/00

[50] Field of Search ........................................... 93/61, 62;
53/56, 57, 58

[56] References Cited
UNITED STATES PATENTS

| 2,061,885 | 11/1936 | Wensler ....................... | 93/61 |
| 3,112,680 | 12/1963 | Hein et al. .................... | 93/61X |

*Primary Examiner*—Travis S. McGehee
*Attorney*—Richards & Geier

ABSTRACT: A control device for use in a machine adapted to carry out sequential operations upon articles is shown. The control device activates and disengages a plurality of operating elements and will cause sequential disengagement and activation of the various operating elements as the machine is deliberately started or shut down but will cause simultaneous disengagement of all operating elements if the machine is stopped by reason of malfunction or accident.

GUNTER EHLSCHEID
Inventor

GUNTER EHLSCHEID
Inventor

By Richard L. Cein
ATTORNEYS

CONTROL DEVICE

DESCRIPTION OF THE INVENTION

This invention relates to a control device which is particularly adapted to be used in a machine, which machine carries out sequential operations upon articles. Examples of such machinery are bagmaking machinery, envelope-making machinery, sequential printing presses, etc.

In machines of this type the various operating elements of the machine are sequentially actuated and disengaged. This causes considerable difficulty in starting up the machine or shutting down the machine at the end of a shift since the operating elements cannot remain in engaged position and also cannot engage when there is no material therebetween to be worked upon. For example, if a machine utilized to manufacture gummed envelopes is considered, it is to be noted that this machine contains a number of adhesive-applying devices, scoring members and printing members. In such a machine all of the adhesive-applying devices must be brought out of contact with the paper if the machine is stopped. Otherwise the adhesive-applying members of these devices would get stuck to the paper and the articles would not properly feed through the respective operations. Also, in connection with the printing elements, the printing rollers must be brought out of contact with the printing plate if the machine is shut down for any considerable period. If this were not done, the ink would dry between the printing roller and the printing plate so that proper printing would not be produced.

In machines of the type involved in this invention it sometimes happens that the machine breaks down during operation. This can be caused for various reasons. When the machine stops, it is conventionally necessary to move all of the operating elements by hand from their operative position to their inoperative position in order to clear the various elements and determine the cause of the breakdown.

In a machine for manufacturing gummed elements, which is the machine utilized to describe this invention, the machine includes a number of inking units, gumming units, window material applying units and a scoring unit. In this machine the feeding of various envelope blanks is performed by suction air. In this machine, mechanism is provided for producing an orderly shutdown and startup of the machine at the beginning and end of a shift so that any envelope blanks which are fed into the machine will leave the machine in the form of finished envelopes before the machine is shut down.

If the machine has to be deliberately stopped for a prolonged period, i.e. at the end of a shift in the factory, as far as possible all those blanks which are fed into the feeding end of the machine should leave the discharge end thereof in the form of finished envelopes. In this case, therefore, the suction air is conveniently first cut off from the sucker at the machine-feeding end, so that no further blanks are fed in from the stack. Then, as quickly as possible, inking devices disposed close behind the feeding end and acting on individual blanks are moved successively into their inoperative position by hand, and so is any adhesive-applying device for the gluing-in of window portions. The device for applying the adhesive to the exposed edges of the stacked blanks is then moved into its inoperative position. The device for applying adhesive to the prefolded lateral flaps can be moved into its inoperative position only when the last blanks whose closure flaps have been gummed and dried move into the folding machine, i.e. about one minute later.

Hitherto, therefore, the aforementioned units have as a rule been moved manually into their inoperative position when the machine was stopped, this being done as quickly in succession as possible if the machine was stopped due to some disturbance; whereas with the deliberate stoppage of the machine for a fairly long time, this was done in the sequence in time corresponding to the emergence of the workpieces from the various units. Conversely, when the empty machine was restarted, the units were moved by hand into their working position in the succession in time corresponding to the feed of the workpieces to the units; on the other hand, when the machine was restarted filled with workpieces, the units were moved in succession as quickly as possible.

In this type of machine devices are provided which automatically perform the moving of the various units into their inoperative or working positions which has hitherto been performed manually. To this end, the invention provides devices for moving the aforementioned units from their operative position with the machine running into their inoperative position with the machine stopped, or vice versa, characterized in that a number of known pneumatic, hydraulic or electrical lifting devices are associated with the aforementioned units and are so controlled that, when the empty machine is started, the units are moved into their working position individually or in groups in the succession in time of the workpieces entering the units, and when the machine is deliberately stopped, the units are moved into their inoperative position in the sequence in time of the workpieces discharged from the units, whereas, when the machine stops due to a disturbance, all the units are automatically and simultaneously moved into their inoperative position, and when the machine is restarted filled with workpieces, the units are automatically and simultaneously moved back into their operative position.

The lifting devices provided according to the invention are preferably pneumatic cylinders which are connected to the suction or compression air line required in any case for operating the machine and whose movement is controlled by magnetic valves.

The above constitutes a brief description of this invention and some of the objects and advantages thereof. Other objects and advantages of this invention will become apparent to the reader of this specification as this description proceeds.

The invention will be further described by reference to the accompanying drawings which are made a part of this specification.

FIGS. 1—4 are fragmentary side elevations of the machine subdivided into four sections from left to right;

Figure 1:
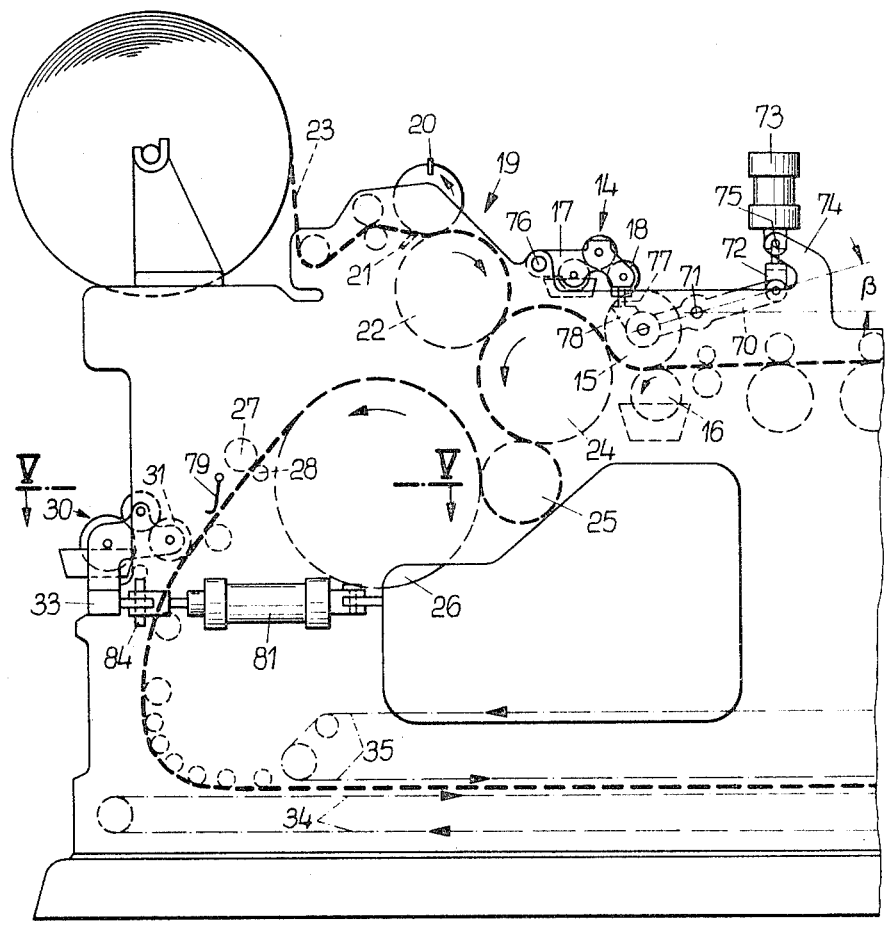

A detailed description of this invention will now be given by reference to the specific form thereof as shown in the accompanying drawings. In this connection, however, the reader is cautioned to note that the specific form of this invention as shown in the specification herein is for illustrative purposes and for purposes of example only. Various changes and modifications could obviously be made within the spirit and scope of this invention.

A known machine for manufacturing printed window envelopes in many colors is illustrated in the drawings and described only to the extent necessary to enable an engineer in the art to understand the invention. The path followed by the blanks through the machine is indicated by a thick dotted line, whereas the direction of rotation or movement of important members is indicated by arrows.

Figure 2:
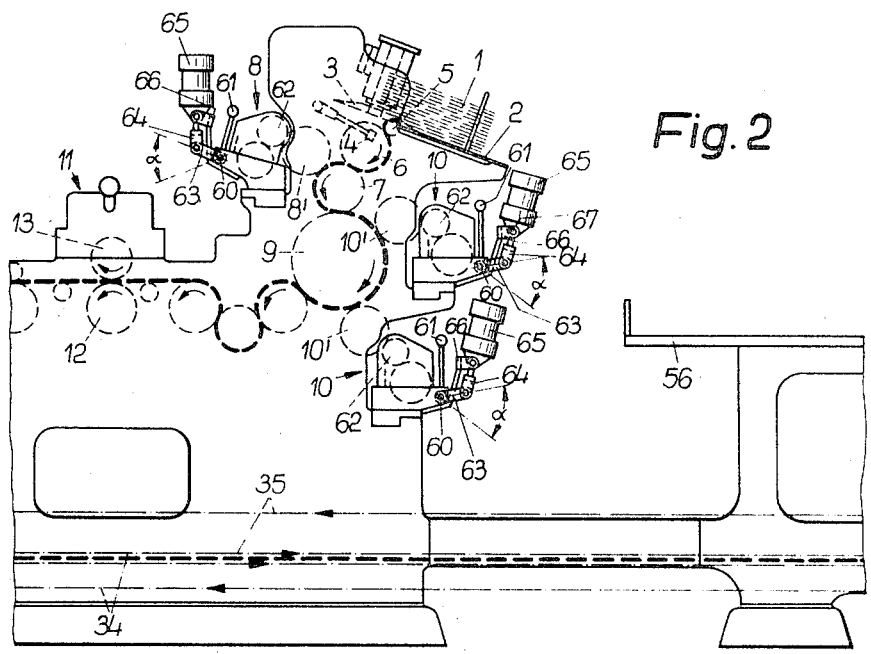

FIG. 2 shows a stack of blanks 1 lying on a plate 2, the front end of the stack, viewed in the feed direction, being supported by two separating discs 3 rotating in opposite directions. The bottom sheet of the stack 1 is seized at the tip by a vertically oscillating sucker 4 and moved under the discs 3, whereafter it is pulled completely away from below the stack between rollers 5 and segment 6 and taken over by a first printing cylinder 7. Associated with the printing cylinder is a printing mechanism 8 having a type cylinder 8' for printing on the subsequent inside of the envelope. Associated with an adjoining printing cylinder 9 are two printing mechanisms 10 having type cylinders 10' for printing in two colors on the subsequent outside of the envelope. Then a window-cutting device 11 is provided for cutting out the window aperture, its main members being a roller 12 bearing a window-cutting blade (not shown) and an externally hardened backing roller 13.

Then follows a device 14 for applying adhesive around the window opening. Its main members are a roller 15 bearing a strip-gumming device (not shown) and the backing roller 16. A gumming mechanism 17 having an applying roller 18 supplies adhesive to the strip-gumming device on the roller 15 (of FIG. 1).

Then follows a device 19 for applying a portion of window material to the window opening. Its main members are a rotary cutter 20, 21 and a suction roller 22 connected downstream thereof by means of which a strip 23 of the transparent window material drawn off a storage roller is first cut to the required length, whereafter the section is glued over the window opening which has previously been gummed around.

Figure 5:
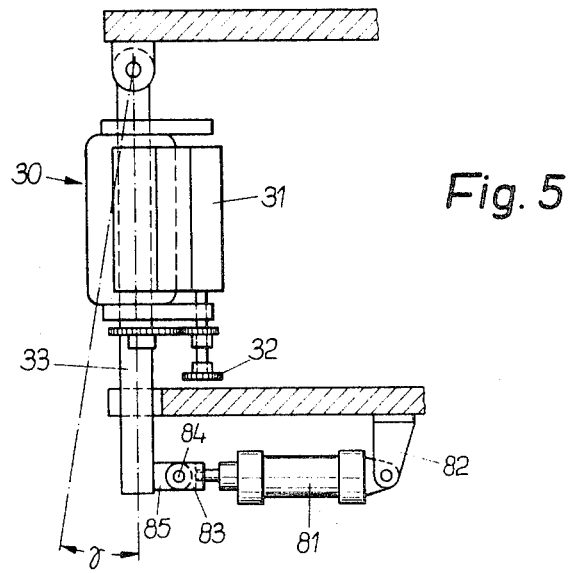
FIG. 5 is a sectional view taken along the line V–V in FIG. 1.

The blanks, which have up to now been moved individually in succession, pass via feed discs 25, 26 into a staggering device, where they are staggered between rollers 27, 28 rotating at a correspondingly lower speed around which belts (not shown) are stretched, for gumming each subsequent closure flap. A gumming mechanism 30 then follows having an applying roller 31 for applying the adhesive to the exposed edges of the blanks. The gumming mechanism 30 with applying roller 31 and drive gears 32 is attached to a pivotable arm 33 (FIGS. 1 and 5).

Figure 4:
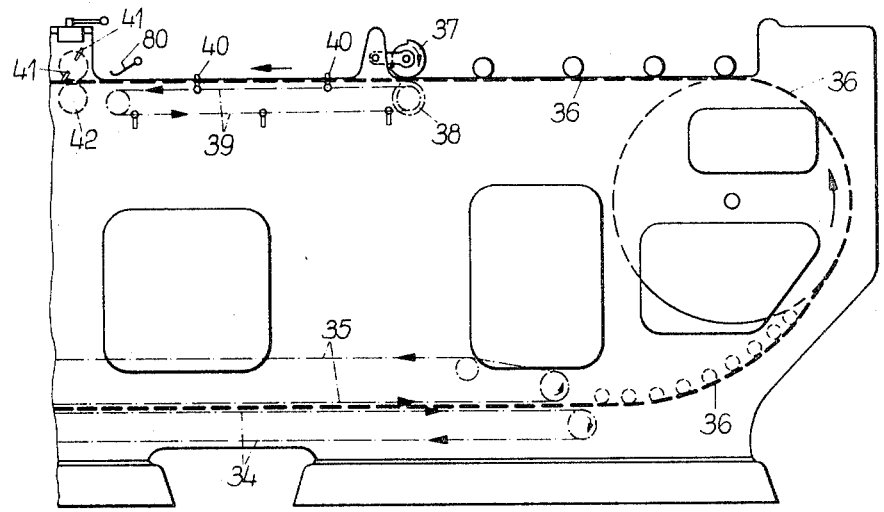

Pairs of conveyor chains 34, 35 are disposed downstream of the belts for conveying the staggered blanks, the ends of the conveyor chains 34, 35 being in operative relationship with conveyor belts (not shown) between which the blanks, which are still staggered and have been dried in the meantime, are fed over a path 36 (FIG. 4) to a device for separating the blanks and comprising segments 37 and backing rollers 38. Adjacent adjusting chains 39 with pins 40 align the blanks and feed them to the folding machine.

Figure 3:
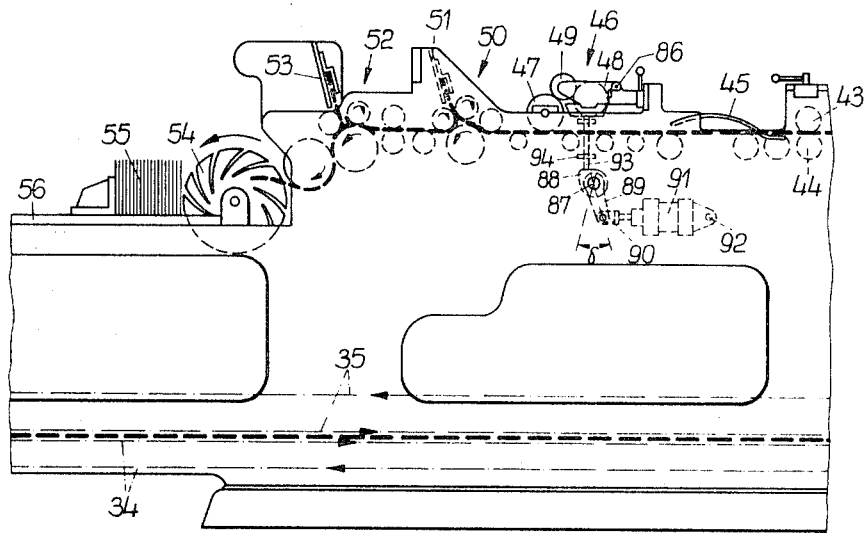

The main members of the folding machine (FIGS. 3, 4) are a device for the preliminary scoring of the depositing table and closure flap having straight prescoring blades 41 and a backing roller 42, a device for prescoring the side flaps, with circular prescoring blades 43 and a backing roller 44, loops 45 for folding the lateral flaps, a device 46 for applying adhesive to the folded lateral flaps, a strip-gumming device 47, a gumming mechanism 48 having an applying roller 49, a bottom-flap folding device 50 having a folding pocket 51, a closure-flap folding device 52 having a folding pocket 53, and depositing discs 54 which convey the finished envelopes in the form of stacks 55 on to a depositing table 56.

The machine described has devices according to the invention for automatically moving the printing mechanisms 8, 10, the device for gumming the window opening, the gumming mechanism 30 for gumming the closure flap, and the device 46 for gumming the lateral flaps. These devices will subsequently be described in the above order.

The printing mechanisms 8, 10 are moved into their inoperative or operative positions by hand, by partially rotating the indexing shaft 60 by means of a lever 61 by an angle $\alpha$(cf. FIG. 2). This rotation makes the ink-applying roller 62 move a slight distance away from the type cylinder 8'; 10'. To perform this movement automatically, a lever 63 is also disposed on the indexing shaft 60, the lever 63 being secured against rotation by a releasable dog-type clutch or the like (not shown). Engaging with the free end of the lever 63 is a fork 64 on the end of the piston rod of the pneumatic cylinder 65 having a double-acting piston. The pneumatic cylinder 65 is mounted to pivot around a pin 67, on an arm 66 secured to the printing mechanisms. In the normal operative condition, therefore, the indexing shaft 60 can be rotated by the angle $\alpha$ via the agency of the pneumatic cylinder 65. In order to adjust the printing mechanism, the dog-type clutch can be disengaged so that the printing mechanism can be moved manually through lever 61.

The roller 15 bearing the strip-gumming device and associated with the device 14 for applying adhesive around the window opening in the blanks is pivotably mounted in two levers 70 rigidly connected to a shaft 71 pivotably mounted on the machine side walls. Engaging at the free end of one or both levers 70 is a fork 72 on the end of the piston rod of a pneumatic cylinder having a double-acting piston. The pneumatic cylinder 73 is mounted to pivot around pin 75 on an arm 74 rigidly connected to the machine sidewall. To move the roller 15 automatically into its inoperative position, the two levers 70, together with the shaft 71, are pivoted through a certain angle $\beta$, and the roller 15 is raised correspondingly. The gumming mechanism 17 can pivot around a pivot 76 and bears via adjusting screws 77 against extensions 78 of the levers 70. As a result of this arrangement, when the levers 70 are pivoted through the angle $\beta$, the applying roller 18 of the gumming mechanism is brought out of contact with the strip-gumming device on the roller 15.

To move the gumming mechanism 30 automatically into its inoperative or operative position, a pneumatic cylinder 81 having a double-acting piston is provided which is pivotably mounted on an arm 82 rigidly connected to the machine sidewall. The fork 83 on the end of the piston rod of the pneumatic cylinder engages via a pin 84 with an attachment 85 of a pivotable arm 33 bearing the gumming mechanism 30. The pneumatic cylinder 81 retains the gumming mechanism 30 in the working position show in FIGS. 1 and 5, the pneumatic cylinder 81 pulling the arm 33 tightly against a stop. To move the gumming mechanism into its inoperative position, the arm 30 is pivoted through an angle $\gamma$ and the drive gear 32 of the gumming mechanism comes out of engagement with a machine gearwheel (not shown). For repair purposes, the pin 84 can readily be pulled out if the arm 33, together with the gumming mechanism, is to be pivoted further outwards, to make machine parts therebehind accessible.

To move the adhesive-applying roller 49 into or out of contact with the gumming device 47 of the unit for gumming the lateral flaps (FIG. 3), there is provided below the gumming mechanism 48 pivotable around a pivot 86, a shaft 87 which is pivotably mounted on the machine sidewalls and on which a cam 88 and a lever 89 are rigidly disposed. A fork 90 on the end of the piston rod of the double-acting piston of a pneumatic cylinder 91 engages with the free end of the lever 89, the air cylinder 91 being mounted to pivot around journals 92 on a rigid retaining member (not shown). Disposed between the lower side of the gumming mechanism 48 and the cam 88 is a tappet 93 slidably guided in bearings 94. When the lever 89 is pivoted out of its working position (FIG. 3) through an angle $\Delta$, the gumming mechanism 48 is pivoted by the cam 88 and the tappet 93 around the pivot 86, so that the applying roller 49 is raised from the gumming device 47. If the gumming device 47 is also to be raised, this could be done as has been described concerning the device 14 for gumming the window opening (illustrated in FIG. 1).

Conveniently all the pneumatic cylinders 65, 73, 81, 91 have pistons operated from two sides. Each pneumatic cylinder is connected via two hoses, and conveniently by relay-controlled magnet valves, to the suction or compressed air line required in any case for operating the machine.

Figure 6:
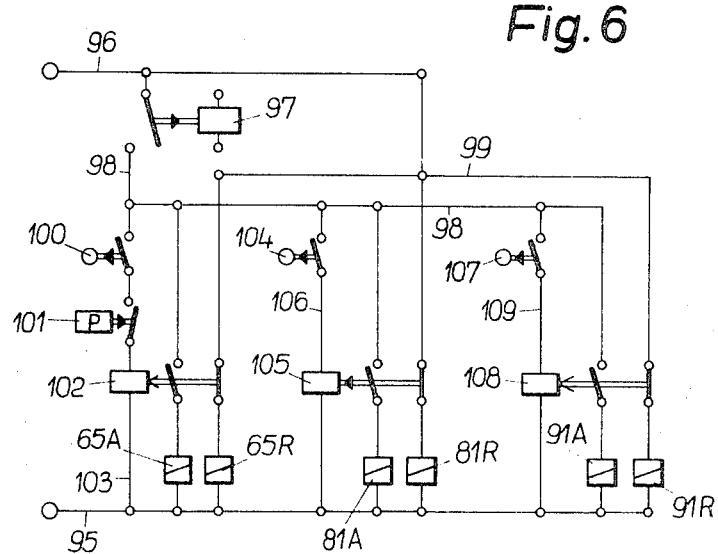
FIG. 6 is a circuit diagram of the control system for the various pneumatic cylinders for moving the units, unenergized and in the inoperative position.
Figure 7:
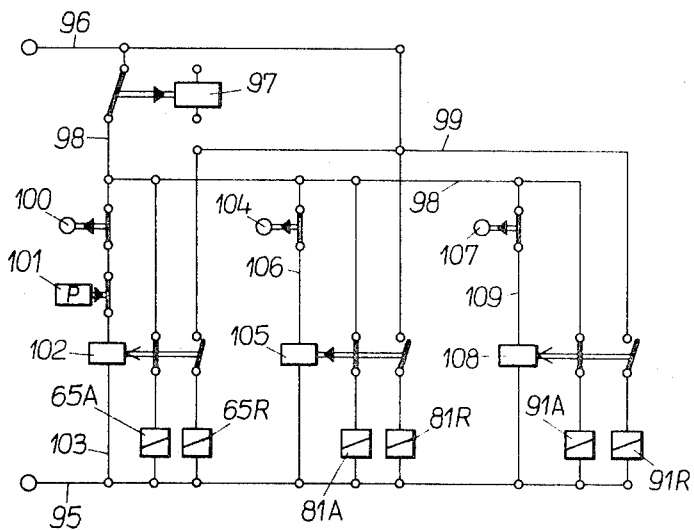
FIG. 7 is a circuit diagram of the control system for the various pneumatic cylinders for moving the units, energized and in the operative position.

The control system for the pneumatic cylinder valves is shown in FIGS. 6 and 7. FIG. 6 shows all the switching elements in their positions with the machine stationary without any paper. FIG. 7 shows all the switching elements in their position with the machine operating normally with paper.

The pneumatic cylinder 65 of the printing mechanisms 8, 10 and the pneumatic cylinder 73 of the device 14 for gumming the widow openings share a magnetic valve 65A for movement into their operative positions, and a magnetic valve 65R for movement into their inoperative positions, both valves being controlled via a relay 102. Similarly, the pneumatic cylinder 81 of the gumming device 30 has magnetic valves 81A, 81R each controlled via a relay 105, the pneumatic cylinder 91 of the device 46 for gumming the folded lateral flaps having magnetic valves 91A, 91R each controlled via relay 108.

Cables 95, 96 are connected to the control circuit (24v.). When the main drive motor has not been switched on, the relay 97 has dropped and the circuit 95–99–96 is closed. The relays 102, 105, 108 have dropped, the magnetic valves 65R, 81R and 91R are energized, and all the pneumatic cylinders and units connected to these magnetic valves are in the inoperative position. Every time the main drive motor of the machine is switched off, this condition is set up, even if the machine is automatically stopped by some disturbance.

A switch 100 opening as the result of the turning of a cutoff slide valve for cutting off the suction air from the sucker (the cutoff valve is turned through an angle of 90° to 180° only) and also a switch 101 which opens when the vacuum falls in the suction air line of the feeding end of the machine (FIGS. 1, 2) are connected in series in the energizing line 103 of the relay 102. The energizing line 106 of the relay 105 includes a mechanically actuated switch 104, and the energizing line 109 of the relay 108 includes a mechanically actuated switch 107. Each of the switches 104, 107 is actuated by a sensor 79, 80 or the like which is disposed in front of the units 30, 48 and keeps the switch closed in the presence of blanks, but opens it if there are no blanks. The dropping of the relays 102, 108 is delayed by about 1 second, so that they do not drop if a single blank fails to appear or even due to the gap between two successive blanks.

To start the machine, in which there are as yet no blanks, the main drive motor is switched on, so that the relay 97 picks up and connects the lines 96, 98 (FIG. 7). All the other switch elements remain in the position shown in FIG. 6 until there is a vacuum present in the machine suction air line, due to the starting of the vacuum pump or connection to a central vacuum installation, so that the switch 100 closes. When suction air is fed to the sucker 4, the switch 101 closes also, the relay 102 picks up, the magnetic valve 65A is energized, and the pneumatic cylinders 65, 73 adjoining move the particular units into their operative position. As soon as staggered blanks arrive at the gumming device 30, the sensor 79 closes the switch 104, relay 105 picks up (FIG. 7), the magnetic valve 81A is energized, and the connected pneumatic cylinder 81 moves the gumming mechanism 30 into it operative position. As soon as blanks arrive at the device 46 for gumming the lateral flaps, the sensor 80 closes the switch 107, the relay 108 picks up, the magnetic valve 91A is energized, and the connected air cylinder 91 moves the gumming mechanism 48 into its operative position. The switching position (FIG. 7) of the normally operating machine is therefore reached.

To stop the machine deliberately, the suction air is cut off from the sucker 4, the switch 100 opens, the relay 102 drops, the magnetic valve 65R is energized, and the units 8, 10, 14 are moved into their inoperative positions. In the absence of blanks below the sensor 79 in front of the gumming mechanism 30, the switch 104 opens, the relay 105 drops, the magnetic valve 81R is energized, and the gumming mechanism 30 is moved into its inoperative position. When the paper subsequently emerges below the sensor 80 at the device 46 for gumming the lateral flaps, the switch 107 opens, the relay 108 drops, the magnetic valve 91R is energized, and the gumming mechanism 48 is moved into its inoperative position. All the units to be moved into their inoperative position have therefore been automatically moved into such position in a sequence in time such that all the workpieces in the machine have been finished.

The invention is not limited to those units and devices for their automatic movement into their inoperative or operative positions which have been described and illustrated by way of example. Instead of two magnetic valves, a three-way slide valve or the like can be used for controlling the pneumatic or hydraulic cylinders. A photoelectric cell or a "fluidic" element can be disposed at a particular place on the machine instead of a mechanical sensor to determine the presence or absence of workpieces. The type cylinders of the printing devices are included among the units which can be moved automatically as required, simultaneously or in a particular time sequence, into their operative or inoperative positions by devices according to the invention. All these variants of the embodiment described are covered by the scope of the invention as set forth in the claims.

I claim:

1. A control device for a machine adapted to carry out sequential operations upon articles, comprising means for causing sequential activation of operating elements as the articles impinge upon each of said operating elements, and means for causing sequential inactivation of operating elements when the machine is shut down as the last article leaves each of said operating elements, said means causing simultaneous inactivation of said operating elements when said machine stops by reason of malfunction or accident.

2. A control device as described in claim 1 said means constituting pneumatic cylinders and control means thereof.

3. A control device as described in claim 2 said pneumatic cylinders having pistons therein operated from both sides.

4. A control device as described in claim 3 said control means being magnetic valves.

5. A control device as described in claim 4 each of said magnetic valves being controlled by a separate relay.

6. An envelope-making machine comprising, in combination and operative relationship, a printing unit, a gumming unit, a folding unit, and window material applying unit, control means for engaging and disengaging each of said units, and a relay operatively connected to said control means, said relay being actuated if a malfunction occurs in said machine and thereupon simultaneously disengaging all of said units.

7. An envelope-making machine as described in claim 6 including a first sensing device operatively connected with said gumming unit and a second sensing device operatively connected with said folding unit, and second relay means operatively connected with each of said sensing devices, so that the respective unit will be rendered inoperative if an article is not in position to be worked on at said unit.

8. An envelope-making machine as described in claim 7 each of said sensing device being a photocell.

9. An envelope-making machine as described in claim 8 including third relay means operatively connected with said printing unit, and switch means operatively connected with said air suction means, said switch means being opened when said air suction means are no operative.